United States Patent
Virolainen et al.

(10) Patent No.: US 10,475,151 B2
(45) Date of Patent: *Nov. 12, 2019

(54) GRAPHICS ENGINE RESOURCE MANAGEMENT AND ALLOCATION SYSTEM

(71) Applicant: Basemark Oy, Helsinki (FI)

(72) Inventors: Teemu Virolainen, Helsinki (FI); Mikko Alaluusua, Helsinki (FI)

(73) Assignee: BASEMARK Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,873

(22) Filed: Nov. 6, 2017

(65) Prior Publication Data

US 2019/0139180 A1 May 9, 2019

(51) Int. Cl.
- G06F 8/41 (2018.01)
- G06T 15/00 (2011.01)
- G06F 9/54 (2006.01)
- G06T 1/20 (2006.01)
- G06T 1/60 (2006.01)

(52) U.S. Cl.
CPC ........... *G06T 1/20* (2013.01); *G06F 8/433* (2013.01); *G06F 9/54* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 5,692,193 | A * | 11/1997 | Jagannathan | G06F 8/451 711/6 |
| 6,496,190 | B1 * | 12/2002 | Driemeyer | G06T 15/005 345/619 |
| 6,538,651 | B1 * | 3/2003 | Hayman | G06T 17/00 345/419 |
| 8,555,035 | B1 * | 10/2013 | Patney | G06F 8/441 712/216 |
| 2007/0097138 | A1 * | 5/2007 | Sorotokin | G06F 17/2247 345/581 |
| 2009/0167758 | A1 * | 7/2009 | Barczak | G06T 17/20 345/420 |
| 2011/0102441 | A1 * | 5/2011 | Rapp | G06F 8/433 345/440 |
| 2012/0117546 | A1 * | 5/2012 | Dow | G06F 8/48 717/128 |
| 2016/0077896 | A1 * | 3/2016 | Bolz | G06F 9/54 719/328 |

* cited by examiner

*Primary Examiner* — Joni Richer
(74) *Attorney, Agent, or Firm* — Jacob Eisenberg

(57) ABSTRACT

Described herein is a method for allocating resources for rendering. The method can include assembling a plurality of render nodes. The render nodes can have their defined input(s) and output(s). From the assembled set of render nodes a schedule can be compiled. The compiled schedule for the plurality of rendering nodes can be based at least on the defined input(s) and output(s). Additionally, the plurality of rendering nodes can be scheduled such that more than one rendering algorithm can be carried out at a point in time. Within the compiling, a set of resource barriers can be defined. The set of resource barriers can include system resource barriers. These system resource barriers can be for processing the set of render nodes based on the created schedule.

16 Claims, 2 Drawing Sheets

GRAPHICS ENGINE RESOURCE MANAGEMENT AND ALLOCATION SYSTEM

FIELD OF INVENTION

The present invention relates to the field of visualization and rendering. In particular, the system deals with resource management and allocation within graphics engines.

BACKGROUND OF INVENTION

With current graphics engines resource allocation is not optimized for individual use cases, they essentially use pool memory which is use-case independent. For example, in an entertainment graphics engine some resources can be permanently allocated for rendering explosions regardless if there are any explosions in a given rendering set. As such, these resources may go to waste during large portions of gaming use and virtually always in, for example, industrial uses.

Additionally, current engines often hide their resource allocation so that it's hard to determine if certain operations results in new allocations.

Furthermore, to avoid having combinatorial explosion between algorithms configurations, certain resources are redundantly allocated. For example, one algorithm might need some temporary texture for intermediate results, but the texture is not needed after the algorithm completes, however, the texture is then kept just for that algorithm and is not accessible for other portions of the rendering pipeline thereby needlessly using system memory resources. Therefore, in current graphics engines this texture cannot be reused in a later stage or a different stage of the rendering pipeline.

A major problem created by current graphics engines system resource allocation is a high degree of memory fragmentation. Due to this, and on many other well known reasons in the art, current graphics engines are not well suited for safety critical environments.

SUMMARY OF THE INVENTION

The present invention allows for more efficiently allocating and utilizing system resources (memory and processor capacity) for a graphics engine for rendering. This allows for better use of a devices resources allowing for either reducing the minimum computing requirements in a device for a given function and/or limiting the demand on resources from the graphics engine thereby freeing up resources for other uses.

Additionally, in safety critical use cases the resource allocation described herein can be pre-defined prior to use in the most efficient manner for the particular required visualization. Prior to use, with the system resource allocation optimized, the system resources can be fixed in their optimized settings so that resources do not need to be re-allocated during use. This therefore enables the use in many safety critical environments.

Described herein is a method for allocating resources for rendering. The method can include assembling a plurality of render nodes. The render nodes can have their defined input(s) and output(s). From the assembled set of render nodes a schedule can be compiled. The compiled schedule for the plurality of rendering nodes can be based at least on the defined input(s) and output(s). Additionally, the plurality of rendering nodes can be scheduled such that more than one rendering algorithm can be carried out at a point in time. Within the compiling, a set of resource barriers can be defined. The set of resource barriers can include system resource barriers. These system resource barriers can be for processing the set of render nodes based on the created schedule.

The schedule and/or barriers can then be stored in a memory of an electronic device. These can be stored prior to rendering, e.g. prior to carrying out an associated render method on a display device.

Once a rendering process is initiated, then based on the schedule and/or barriers orders can be issued to a host device. The host device can be, or can include, a graphics processing unit (GPU). The host device can also be, or can include a central processing unit (CPU) or other whole or portion of a processing unit. Once the orders are carried out by the host device then a desired image is rendered.

DETAILED DESCRIPTION OF EXEMPLARY EMBODIMENTS

Figure 1:
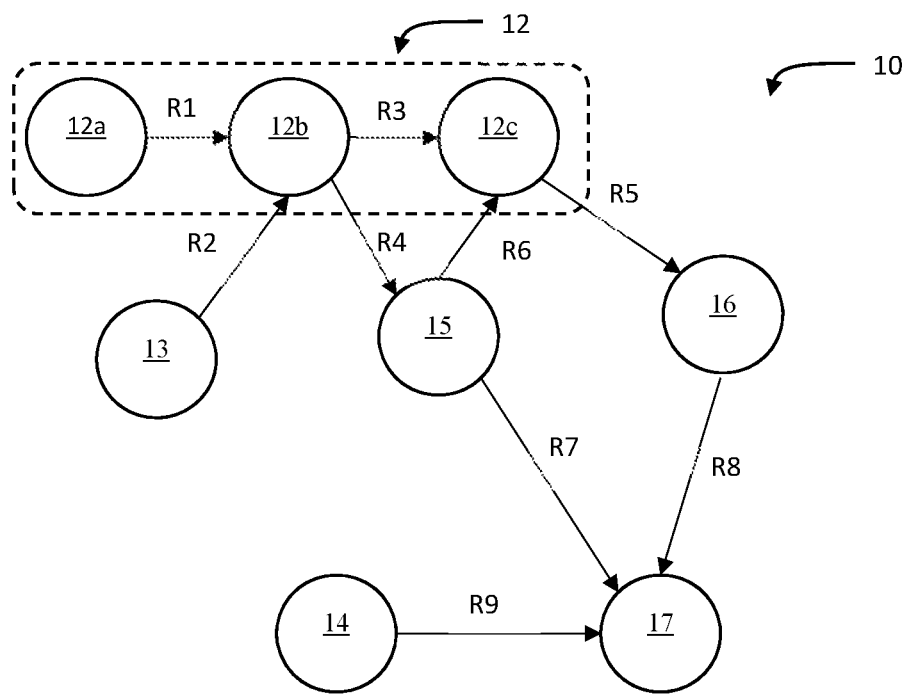
FIG. 1 shows an example acyclic graph of render nodes.

One method of system resource allocation is defining a rendering algorithm as an independent work unit which handles its own resource allocation. Another method of system resource allocation is defining a rendering algorithm as collection of linked render nodes. In the examples herein, the rendering algorithm is typically the latter as will be discussed in more detail below. However, both methods can be utilized herein.

Each rendering algorithm and/or render node herein can define what it expects as an input and what it outputs. An example of a rendering algorithm can be an opaque rendering algorithm. An example of an input for an opaque rendering algorithm is shadow map data. Additionally, there can be several inputs for a given rendering algorithm. For example, an additional example input would be light data for the opaque rendering algorithm.

Rendering algorithms can be combined into a high level rendering pipeline. A high level rendering pipeline can define a chain of rendering algorithms and/or render nodes which produces a final image. For example, a high level rendering pipeline can include a shadow map generation rendering algorithm, light data calculation rendering algorithm, opaque object rendering algorithm, transparent object rendering algorithm, tonemapping rendering algorithm and depth of field rendering algorithm.

A rendering algorithm itself can be a linked chain of render nodes. Each render node can define what kind of resources it needs as an input, and what kind of resources it outputs. The higher level rendering pipeline can be a compiled chain, list or graph of render nodes. For example, the rendering nodes of different rendering algorithms can be interspersed with each other in the chain of the higher level rendering pipeline. Additionally, the linked chain can have a combination of parallel and series links so that certain render nodes and/or rendering algorithms can be carried out at the same time.

Resources can be the required inputs and outputs of a render node or rendering algorithm. These can include data, data sets, scenes, parameters etc. that go into a rendering process of a render node.

More generally, a rendering algorithm as described herein can be a dedicated process within a rendering pipeline (e.g. a shadow map generation rendering algorithm, light data calculation rendering algorithm, opaque object rendering algorithm, transparent object rendering algorithm, tonemapping rendering algorithm and depth of field rendering algorithm). A rendering algorithm can include only a single rendering node or it can include a plurality of rendering nodes.

A rendering node as described herein can be a process, routine, rendering pass or work unit which has dependencies. E.g. one pass of a shadow rendering algorithm or an orb glow rendering node for an object type. A sub-unit, e.g. a single work unit, of a larger rendering algorithm (e.g. a circle of confusion work unit within a depth of field rendering algorithm)

System resources can be, but are not limited to, GPU memory, CPU memory and processing capacity.

Rendering resources as described herein can be data sets either available to the graphic engine (e.g. textures) or data sets created within a rendering pipeline (e.g. light data from a light data calculation stage), memory cache requirement or processing requirements.
Framebuffers System barriers can be, but are not limited to, cache flushing of memory (GPU, CPU, etc.), scheduling orders for when certain render algorithms/render nodes are to be or can be run, processing requirements for a certain rendering node/rendering algorithm or set thereof, indication of which rendering nodes/rendering algorithms are dependent upon on others, indication of which rendering nodes/rendering algorithms can share system resources, indication of which rendering nodes/rendering algorithms can be executed at the same time. System barriers can also be explicit commands issued to, or to be issued to, a processor, e.g. a GPU. An example of a system barrier is a command that everything which comes in before the barrier must finish before the next set of processes starts. Semaphores can be a system barrier.

By 'at the same time' it is generally meant that at a given time during rendering two or more distinct processes, e.g. render nodes and/or rendering algorithms, can be active. They may be running simultaneously where they both start and/or finish at the same time. However, they also may be merely overlapping and where the two processes running at the same time can start and stop independently.

An acyclic graph can be created where the nodes of the acyclic graph are rendering algorithms and/or render nodes within a pipeline. For example, all of the work needed to be done by a GPU can be represented as nodes in an acyclic graph. Within an acyclic graph, the edges/links between the nodes of the acyclic graph can be the respective inputs and outputs of the rendering algorithms and/or render nodes. As discussed herein, an acyclic graph is typically a directed acyclic graph.

An example directed acyclic graph 10 of a simple render pipeline is shown in FIG. 1. The acyclic graph 10 includes a plurality of render nodes 12a-12c & 13-17. Each render node is a process which has defined inputs and outputs R1-R9. As shown in the example, there can be a render algorithm 12 which is composed of a series of render nodes 12a, 12b and 12c. The render algorithm can be subdivided as such based on the sub processes having different input and output requirements.

As can be seen from the graph 10, render node 12a outputs resource R1 which is an input for render node 12b. Render node 12b also requires the output R2 of render node 13. Render node 12b then outputs resources R3 and R4 which are inputs to render nodes 12c and 15 respectively. Resources R3 and R4 can be the same information and simply shown as two edges in the acyclic graph 10 as, while the information is the same, there are two distinct inputs. As well, the process of render node 12b can create two separate sets of data at the same time which are distinct outputs and distinct inputs.

Render nodes 13 and 15 for example can be essentially the same process and simply two distinct passes of that same process. Since the two passes of the same process will have different inputs and outputs, as seen from the graph, they can therefore be considered as separate render nodes within the render pipeline.

As can be seen from the directed graph, render nodes 12a-16 feed into final node 17 which is then capable of rendering the completed image. A more concrete example of a render pipeline with defined render nodes is described below. However, any render pipeline can be described as these render nodes having distinct inputs and outputs. With this information the pipeline can be assembled into a similar acyclic graph.

An order of a rendering pipeline, e.g. a high level rendering pipeline, can be set based on an acyclic graph of the units. The units of the high level rendering pipeline can be render nodes, rendering algorithms of a combination thereof. The order can be set, for example, by carrying out a topological sort function on the acyclic graph. The outcome can then be an ordered single list of work units to be executed during rendering. Additionally, this list of work units can include the work units which can be carried out at the same time and/or information on which work units can be carried out at the same time. Such information can include information on which work units do not depend on, or need information from, certain others. Similarly, such information can include information on which work units require the same, or similar, resources.

Furthermore, based on the edges/links of an acyclic graph a set of system resource barriers can be defined. These barriers or information regarding these barriers can be stored within a rendering pipeline and/or can be accessible thereto. Therefore, these system resource barriers can be issued prior to, or during execution of a rendering pipeline to which they relate.

A liveness analysis can also be carried out based on an acyclic graph. From the liveness analysis memory allocation and/or memory cache flushing for an associated rendering pipeline can be determined. The memory allocation and/or memory cache flushing can thus be determined based on the resources described by the edges/links of the acyclic graph. Similarly, the memory allocation and/or memory cache flushing can thus be determined based on the inputs and outputs of render nodes and rendering algorithms. Therefore, memory can be allocated to a render node or rendering algorithm for only as long as needed while being executed.

The memory allocation and/or memory cache flushing, or information regarding that, can be stored within a rendering pipeline and/or can be accessible thereto. Therefore, memory can be partitioned, allocated and/or flushed prior to, or during execution of a rendering pipeline to which they relate.

Render nodes can be created separately from a broader rendering algorithm. For example, a high level rendering pipeline can contain a set of generic rendering algorithms, e.g. shadow map generation rendering algorithm, light data calculation rendering algorithm, opaque object rendering algorithm, etc. A user can then define one or more unique and/or additional render nodes. An example of a render node can be a specific glow around a certain object or object type. A render node can be considered as a specific work unit. A render node can also be considered to be defined by its inputs and outputs. For example, an orb glow render node can have the orb glow data for an object as its output and can have as its input light data, object position/orientation data and object surface texture data.

A render node defined by its inputs and outputs can be easily created by a user without detailed knowledge of a larger rendering pipeline or how the render node fits in. However, with defined inputs and outputs the render node can easily be added to an acyclic graph, for example an existing acyclic graph, and then sorted and integrated seamlessly within a rendering pipeline.

Additionally, a render node can be one pass of a rendering algorithm. A render node can also be several linked passes of one or more rendering algorithms. A render node can also be or include a rendering routine. For example, the sub-work unit takes a set of inputs, runs it through a routine, and produces an output. The routine can be simple or complex and can be predetermined or dynamic.

According to certain examples, information relating to memory requirements can be stored in and/or accessible to a lower level rendering pipeline. Thus, as an example, a high level rendering pipeline can define the order of work units (render nodes and/or rendering algorithms) to be carried out during rendering and a lower level pipeline can go through a rendering graph to determine minimal state transitions and associated memory requirements. Furthermore, as an example, a lower level rendering pipeline can determine to use more memory than minimally required in order to run multiple work units or render nodes at the same time. The information on which work units and/or render nodes can be run at the same time can be stored in and/or accessible to either of the high or low level rendering pipelines.

Additionally, while there is described herein a high/higher level rendering pipeline and a low/lower level rendering pipeline, any feature herein described in one level can be moved and/or copied to the other level. Furthermore, all of the features described herein can be combined into a single level rendering pipeline or dispersed in to one or more third rendering pipelines. Similarly, what is described herein as a high level rendering pipeline can be swapped into and/or simply be considered a low level rendering pipeline and vice versa.

The methods described herein can be run in real time or can be carried out prior to rendering. For example, the content and/or order of rendering pipelines, system resource barriers, memory allocation information or a combination thereof can be predetermined. During an execution of a program for displaying an image on a display device, the program/graphics engine can simply be issued or access the predetermined information and then carry out the final rendering.

As an example, a simple rendering pipeline can include a shadow map generation render node, light data calculation render node, opaque objects rendering algorithm, transparent objects rendering algorithm, tonemapping render node and depth of field rendering algorithm. From an acyclic graph it can be determined that the opaque objects rendering algorithm and transparent object rendering algorithm each require shadow map data output from the shadow map generation render node and light data from the light data calculation render node.

Since light data and shadow map generation do not depend on each other, a graphics engine or GPU can schedule this work, e.g. these two render nodes, to run in parallel, e.g. at the same time. Furthermore, the graphics engine can make sure these render nodes are completed before an opaque pass render node is scheduled from the opaque objects rendering algorithm. The system resource barriers here can be the order, or information on the order, of the render nodes to be executed and their associated CPU/GPU requirements for each.

As the transparent objects rendering algorithm depends on both shadow map data, light data and an opaque pass output as inputs, so the graphics engine can schedule the transparent objects rendering algorithm to execute after a required opaque pass render node is finished.

Following this can be scheduled tonemapping and depth of field. If the tonemapping render node requires intermediate textures (e.g. downsample of the scene) as an input and the depth of field rendering algorithm also needs the intermediate textures, the scheduler can opt to share the same memory to be used by the tonemapping render node and the depth of field rendering algorithm. If necessary, the scheduler can also issue correct barriers between them. For example, instead of issuing a command to flush a memory cache of the intermediate textures after a tonemapping render node pass, a depth of field render node pass can be scheduled at a similar time, use the same cached intermediate texture data and only thereafter is an instruction for the intermediate texture data to be flushed from the memory cache.

Furthermore, the depth of field rendering algorithm might only need depth for an internal circle of confusion calculation render node. However, in a later render node the depth of field rendering algorithm needs the tonemapping output. Therefore, the scheduler can execute the tonemapping render node and circle of confusion calculation render node to be run in parallel. Therefore, these render nodes can be run at the same time even though a tonemapping rendering algorithm and a depth of field rendering algorithm as wholes could not be run at the same time.

Figure 2:
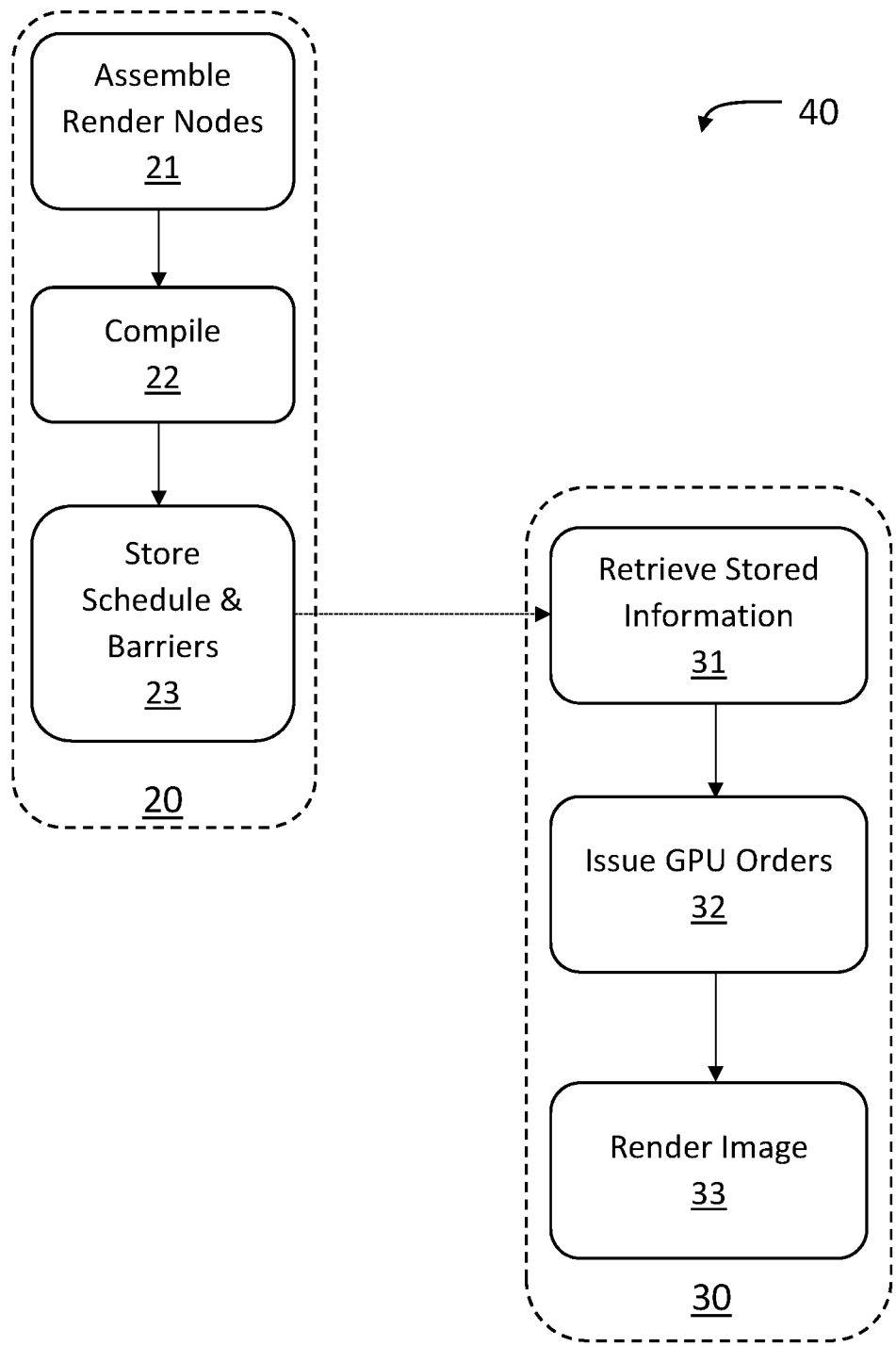
FIG. 2 shows an example resource allocation method.

FIG. 2 shows an example high level method 40 which implements the principles described herein. The high level method 40 can include two separate methods 20 and 30. Method 20 as shown can be considered as a pre-processing stage. Method 20 can be carried out, for example, in pre-processing on a first device, host device or display device. Method 30 can be for example a rendering method on a display device. As such, methods 20 and 30 can be carried out on independent devices or on the same device. Additionally, steps within the two methods, or the two methods themselves, can run sequentially or parallel. Additionally, for example method 20 can be run once on a first device and then method 30 can be run later on multiple different display devices.

Method 20 describes a method for allocating resources for rendering. The method includes assembling 21 a plurality of render nodes. The render nodes can have their defined input(s) and output(s). From the assembled set of render nodes a schedule can be compiled 22. The compiled schedule for the plurality of rendering nodes can be based at least on the defined input(s) and output(s). Additionally, the plurality of rendering nodes can be scheduled such that more than one rendering algorithm can be carried out at a point in time. Within the compiling, a set of resource barriers can be defined. The set of resource barriers can include system resource barriers. These system resource barriers can be for processing the set of render nodes based on the created schedule.

The schedule and/or barriers can then be stored 23 in a memory of an electronic device. These can be stored prior to rendering, e.g. prior to carrying out the associated method 30 on a display device.

The information from method 20 can then be retrieved by a rendering process 30. Once the rendering process 30 is initiated, then based on the schedule and/or barriers orders can be issued 32 to a host device. The host device can be, or can include, a graphics processing unit (GPU). The host device can also be, or can include a central processing unit (CPU) or other whole or portion of a processing unit. Once the orders are carried out by the host device then a desired image is rendered 33.

Method 20, 30 or 40 can include creating a high level rendering pipeline and a lower level rendering pipeline. The high level rendering pipeline can includes said assembly 21 of rendering nodes and their dependencies. The lower level rendering pipeline can include the compiling 22 and created/stored schedule and barriers. The lower level pipeline can include determining minimal state transitions and/or memory requirements for each of the rendering nodes. Furthermore, the lower level pipeline can include the explicit orders and/or issuing 32 the explicit orders.

Essentially, the lower level pipeline can handle the actual resource allocation for the rendering. The high level rendering pipeline can thus contain the information about the processes and dependencies which require the resource allocation. For example, the high level rendering pipeline can define a chain of the rendering nodes which is capable of producing a desired rendered image or set of images. The lower level rendering pipeline can, among other things, then determine how many rendering nodes can be run parallel at the same time at a given point in time.

Creating a schedule and/or compiling can include creating the directed acyclic graph of the render nodes, their inputs and their respective outputs. Within the acyclic graph, the nodes can be render nodes and/or render algorithms. The edges between the nodes in the acyclic graph can be the dependencies between the render nodes based on the inputs and outputs of the render nodes.

Method 20 can further comprise, for example within compile step 22, topologically sorting an acyclic graph into a single list. The single list can be an order of render nodes which can be executed. An order can include dependencies between different render nodes including which render nodes or sets of render nodes can be executed independently of others.

System resource barriers can be defined based off of the edges from the acyclic graph, for example within compile step 22. A defined set of system resources can includes host device (e.g. CPU or GPU) resource requirements and/or allocation. For example, memory can be allocated for a render node for only the required amount of time for the render node. Rendering resources necessary as input for one render node can be kept in a memory cache and re-used for another render node. Additionally, for example when a resource is read-only, multiple render nodes utilizing the same or similar rendering resources and which are independent can be scheduled near each other to utilize the cached rendering resource.

Memory cache flushing instructions can be issued 32 for the cached rendering resource from the set of system resource barriers are issued, or scheduled to be issued, after the last render node which needs the same or similar rendering resource has output its product. Memory can be allocated and/or memory cache flushing instructions can be created based on a liveness analysis of the edges of an acyclic graph of the render nodes of a rendering pipeline. One example herein is graph coloring.

A benefit which arises from the present methods are that a user can define a process independently outside of a rendering engine/graphics engine. The process can then be set as a render node with resources which it needs to run. The render node can then be added to an existing render pipeline and/or set of render nodes. The new set of render nodes with the additional render node can then be re-compiled. In this manner, a developer can easily add, modify and remove small processes or sets of processes from a larger pipeline without needing to explicitly know themselves how those changes will affect the overall resource allocation of the rendering process. Therefore, a method 20 can further include defining a new render node, its required inputs and its required outputs, and adding the new render node to an existing render pipeline. The new render node can be added by adding the new render node to an acyclic graph of the existing render pipeline based on its required inputs and outputs and re-compiling to create a new schedule and set of system resource barriers based on the new set of render nodes.

Additionally, there can be an electronic device including a graphics processing unit (GPU), an electronic display associated with the GPU, an embedded graphics engine having a set of rendering algorithms for being carried out on the GPU to produce an image on the electronic display, and a non-transitory computer readable medium having stored thereon a set of predefined system resource barriers capable of being assigned to the GPU and a predefined scheduled order of the rendering algorithms for processing.

Furthermore, there can be a non-transitory computer readable medium having stored thereon a set of computer readable instructions for causing a processor of a computing device to carry out the methods and steps described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

We claim:

1. A method for allocating resources for rendering comprising computer implemented steps of:
    assembling a plurality of rendering nodes each having a defined input and output, wherein each render node is a routine and/or a piece of work which is to be performed by a graphics processing unit (GPU),
    creating a schedule for the plurality of rendering nodes based at least on the defined input and output, wherein the plurality of rendering nodes are scheduled such that more than one rendering algorithm can be carried out at a point in time,
    defining a set of system resource barriers for processing the set of rendering nodes based on the created schedule,
    wherein the defined set of system resource barriers and the created schedule are stored in a computer readable medium prior to rendering
    wherein the method includes creating a high level rendering pipeline and a lower level rendering pipeline, wherein the high level rendering pipeline includes said assembly of rendering nodes and their dependencies, and wherein the lower level rendering pipeline includes creating the schedule and defined set of system resource barriers, and wherein the lower level rendering pipeline further includes determining minimal state transitions and/or memory requirements for each of the rendering nodes, and
    wherein the lower level rendering pipeline can determine how many rendering nodes can be run parallel at the same time at a given point in time.

2. The method of claim 1, wherein creating the schedule includes creating a directed acyclic graph of the render nodes, their inputs and their respective outputs.

3. The method of claim 2, wherein within the acyclic graph, the nodes are render nodes and/or render algorithms and the edges between the nodes in the acyclic graph are dependencies between the render nodes based on the inputs and outputs of the render nodes.

4. The method of claim 2, further comprising topologically sorting the acyclic graph into a single list which is an order of render nodes which can be executed.

5. The method of claim 2, wherein the system resource barriers are defined based off of the edges from the acyclic graph.

6. The method of claim 1, wherein a plurality of render nodes forms a rendering algorithm.

7. The method of claim 1, wherein a render node is a pass of a rendering algorithm.

8. The method of claim 1, further comprising defining a new render node, its required inputs and its required outputs, and adding the new render node to an existing render pipeline.

9. The method of claim 8, wherein the new render node is added by adding the new render node to an acyclic graph of the existing render pipeline based on its required inputs and outputs and re-compiling to create a new schedule and set of system resource barriers based on the new set of render nodes.

10. The method of claim 1, wherein a defined set of system resources includes memory cache flushing instructions and/or memory allocation.

11. The method of claim 10, wherein rendering resources necessary as input for one render node are kept in a memory cache and re-used for another render node.

12. The method of claim 11, wherein multiple render nodes utilizing the same or similar rendering resources and which are independent are scheduled near each other to utilize the cached rendering resource.

13. The method of claim 12, wherein memory cache flushing instructions for the cached rendering resource from the set of system resource barriers are issued, or scheduled to be issued, after the last render node which needs the same or similar rendering resource has output its product.

14. The method of claim 1, wherein the memory is allocated and/or memory cache flushing instructions are based on a liveness analysis of the edges of an acyclic graph of the render nodes of a rendering pipeline.

15. A non-transitory computer readable medium having stored thereon a set of computer implementable instructions for carrying out steps of any of a method for allocating resources for rendering comprising computer implemented steps of: assembling a plurality of rendering nodes each having a defined input and output, wherein each render node is a routine and/or a piece of work which is to be performed by a graphics processing unit (GPU), creating a schedule for the plurality of rendering nodes based at least on the defined input and output, wherein the plurality of rendering nodes are scheduled such that more than one rendering algorithm can be carried out at a point in time, defining a set of system resource barriers for processing the set of rendering nodes based on the created schedule, wherein the defined set of system resource barriers and the created schedule are stored in a computer readable medium prior to rendering, wherein the method includes creating a high level rendering pipeline and a lower level rendering pipeline, wherein the high level rendering pipeline includes said assembly of rendering nodes and their dependencies, and wherein the lower level rendering pipeline includes creating the schedule and defined set of system resource barriers, and wherein the lower rendering pipeline further includes determining minimal state transitions and/or memory requirements for each of the rendering nodes, and wherein a lower level rendering pipeline can determine how many rendering nodes can be run parallel at the same time at a given point in time.

16. A method for rendering an image on an electronic display device comprising computer implemented steps of:
    receiving a set of system resource barriers for a graphics processing unit (GPU) associated with the electronic display device, receiving a scheduled order of a set of rendering algorithms to be rendered by the GPU, wherein at least some of the rendering algorithms can be processed at the same time, rendering an image on the electronic display device by carrying out the rendering algorithms in accordance with the received schedule using assigned system resources of the GPU based on the set of received system resource barriers, wherein the defined set of system resource barriers and the created schedule are stored in a computer readable medium prior to rendering, wherein the method includes creating a high level rendering pipeline and a lower level rendering pipeline, wherein the high level rendering pipeline includes said assembly of rendering nodes and their dependencies, and wherein the lower level rendering pipeline includes creating the schedule and defined set of system resource harriers, and wherein the lower level rendering pipeline further includes determining minimal state transitions and/or memory requirements for each of the rendering nodes, and wherein the lower level rendering pipeline can determine how many rendering nodes can be run parallel at the same time at a given point in time.

* * * * *